(12) United States Patent
Desnijder et al.

(10) Patent No.: US 6,425,232 B1
(45) Date of Patent: Jul. 30, 2002

(54) CROP PROCESSOR ROLL ARRANGEMENT FOR A FORAGE HARVESTER

(75) Inventors: Dirk J. Desnijder, Wondelgem; Cyriel R. J. De Busscher, Sijsele; Adrianus Naaktgeboren, Varsenare, all of (BE); Sandor W. Van Vooren, Aardenburg (NL); Guy H. J. Osselaere, Loppem (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/869,879
(22) PCT Filed: Dec. 22, 2000
(86) PCT No.: PCT/EP00/13354
§ 371 (c)(1),
(2), (4) Date: Jul. 9, 2001
(87) PCT Pub. No.: WO01/47342
PCT Pub. Date: Jul. 5, 2001

(30) Foreign Application Priority Data

Dec. 27, 1999 (GB) .............................................. 9930743

(51) Int. Cl.$^7$ .......................... B02C 21/02; A01D 43/08
(52) U.S. Cl. .............. 56/16.4 B; 56/14.3; 241/101.763
(58) Field of Search .................... 56/2, 14.3, 16.4 B, 56/14.5, 14.6, 16.6, 15.1, 15.3, 15.5, 95; 241/101.742, 101.763, 186.3, 222, 185.5, 223, 224

(56) References Cited

U.S. PATENT DOCUMENTS

| 4,223,846 A | * | 9/1980 | Priepke et al. ................. 241/60 |
|---|---|---|---|
| 4,345,417 A | * | 8/1982 | deBuhr et al. ................ 56/14.3 |
| 4,678,129 A | * | 7/1987 | Dallinger ................. 241/101.7 |
| 6,116,529 A | * | 9/2000 | Fisher, Jr. et al. ..... 241/101.763 |
| 6,125,617 A | * | 10/2000 | Villers et al. ..................... 56/2 |

FOREIGN PATENT DOCUMENTS

| DE | 19538199 A1 | * | 4/1997 | .......... A01D/43/08 |
|---|---|---|---|---|
| DE | 19638034 A1 | * | 3/1998 | .......... A01D/43/08 |
| EP | 0680687 A1 | * | 4/1995 | .......... A01D/41/14 |
| EP | 0177995 | * | 9/1995 | .......... A01F/29/10 |
| FR | 2539950 | * | 1/1984 | .......... A01F/29/00 |
| FR | 2571214 | * | 9/1985 | .......... A01F/29/12 |

* cited by examiner

*Primary Examiner*—Robert E. Pezzuto
(74) *Attorney, Agent, or Firm*—John William Stader; Larry W. Miller

(57) ABSTRACT

A forage harvester and a method of operating the same which comprises a crop processor unit located in a crop flow between a cutterhead and a blower rotor, the crop processor unit being for handling crop material including kernels, the crop processor comprising a pair of counter-rotating processor rolls arranged to crack kernels between the rolls when the rolls are in a first position, both processor rolls being movable away from each other to move each roll substantially out of the crop flow into a second position. A cover plate is preferably arranged to move and cover the lower roll when the rolls are in a second position and to isolate the lower roll from the crop flow. The processor rolls are preferably driven by independent drives. One of the drives can be a hydraulic motor supplied with pressure from a hydraulic pump which can also work as a motor. When used as a motor the cutterhead may be driven in the reverse direction for maintenance purposes.

27 Claims, 8 Drawing Sheets

CROP PROCESSOR ROLL ARRANGEMENT FOR A FORAGE HARVESTER

The present invention relates generally to forage harvesters having means for processing crop material including maize kernels, these means, for instance, comprising a compressor roll assembly, operable to crack the maize kernels as well as means for processing kernel-free crops such as alfalfa or grass. The present invention also relates to a method of processing crop material including maize kernels or kernel-free crops such as alfalfa or grass.

TECHNICAL BACKGROUND

A forage harvester is an agricultural machine for comminuting crop material for silage purposes. Such harvester is mainly used to harvest grass and maize. With grass-like materials (kernel-free) it is sufficient to slit the crop material, e.g. the stems of the plants are cut to length using a cutter, e.g. a rotating knife drum. When cutting maize the cobs may be slit into smaller size but the majority of the kernels are not broken or cracked. This reduces the nutrient value of the silaged crop as the kernels are more-or-less indigestible if not cracked. A cutterhead unit of a forage harvester is used to receive crop material harvested from the field and comminute it into forage which is fed by a blower or accelerator to a temporary container, before being stored and eventually foddered to livestock. In order to facilitate the complete digestion of the crop material, including the maize kernels, the outer skin of the kernels has to be cracked or cut. This can be done by a set of closely adjacent, co-operating compressor rolls with fluted surfaces, installed in front of the blower or accelerator, as shown for example in EP-A-0 177 995, EP-A-0 664 077 or EP-A-0 680 687.

When chopping maize, forage harvesters make use of the crop processor to crack the kernels in order to obtain a higher nutrient value of the chopped material. In that case the chopped material is thrown by the cutter-head into the crop processor, which processes (cracks) the kernels and transfers the material with sufficient speed into a blower or accelerator, which in its turn ejects the crop into a trailer or container. When chopping other kernel-free crops such as grass or alfalfa, the crop processor is redundant but the rolls may still be worn by the sand/earth in the crop material and damaged by stones therein. It is often removed from the material flow by physically removing it from the machine.

To remove the crop processor from the crop path various methods have been proposed. For example, the complete crop processor may be removed as known from DE-A-40 40 888. In DE-A-195 38 199 it is proposed not to remove the crop processor rolls but to change the direction of crop flow by means of a deflector plate. As yet another alternative, the crop processor may remain in the harvester but means are provided for shifting the crop processor unit between an active position, in which it registers with a duct from the cutter-head and an inactive position, behind the duct. Such a system is known from DE-A-42 15 696.

According to DE-A-34 07 333, DE-A-35 22 376, DE-A-196 38 034 and DE-A-33 13 673 the distance between the rolls of the crop processor is increased to leave a gap between the rolls. DE-A-34 07 333 describes allowing one roll of a roll pair to be swung away from the other of the pair. The disadvantage of this method is that one roll remains in a fixed position and is therefore still in the crop flow even when it is supposed not to be in use. DE-A-196 38 034 attempts a solution to this problem by providing a cover plate over the fixed roll when the moveable roll is in the raised, inactive position. With the crop processor known from DE-A-35 22 376 the moveable roll remains in the crop path even in the inactive position. Further, this known device uses a belt drive for both of the counter-rotating crop processor rolls. This requires the back of the belt to be used for one of the rolls. Generally, the back of a drive belt is not ideal for driving a crop processor roll particularly when the belt gets wet from contact with wet crops or mud. DE-A-33 13 673 describes a device in which the crop processor rolls are mounted on either side of a plate. The grinding action of the crop processor is therefore provided between each roll and the fixed plate. The speed differential is therefore high and cannot be set optimally. Both crop processor rolls may be moved away from the plate to take them out of the crop flow. The device also requires locating the axles of the crop processor rolls at 90° to their normal position (i.e. vertically instead of horizontally which requires a complicated 90° angle drive onto the crop processor rolls.

It is an objective of the present invention to provide a better arrangement for introducing compressor rolls into the stream or removing the same therefrom.

It is also an objective of the present invention to avoid the use of the back of a belt drive in order to drive one of the counter-rotating crop processor rolls.

SUMMARY OF THE INVENTION

According to the invention a forage harvester is provided having a crop processor unit located in a crop flow between a cutterhead and a blower, the crop processor unit being provided for handling crop material including kernels, the crop processor comprising a pair of counter-rotating processor rolls arranged to crack kernels between the rolls when the rolls are in a first position, both processor rolls being movable away from each other to move each roll substantially out of the crop flow.

According to an embodiment of the present invention, the drive connection to one of the pair of crop processor rolls is independent of the drive to the other roll thereof. One or both of the independent drives may be a belt drive. For example, it is preferred to drive one of the rolls more slowly than the other. Preferably, the more slowly driven roll is beneath the faster driven roll. The drive to the faster roll is preferably a belt drive. The drive to slower of the two rolls may be a further belt drive or an electric, hydraulic or pneumatic drive. A hydraulic drive is particularly preferred. The drive may operate directly on the relevant crop processor roll and may be connected to the harvester by means of a flexible power connection, e.g. a cable, conduit or pipe. The power unit for driving the roll may be, for example a hydraulic pump, a compressor or an electric power supply. It is preferred if the hydraulic drive is also used to rotate the cutterhead in the reverse direction if required. It is preferred if a cover plate moves over the lower of the two counter-rotating rolls when the rolls are moved into their widely spaced position so that the lower roll is isolated from the crop flow.

The forage harvester in accordance with the present invention may be self-propelled or may be towable by a tractor.

According to a further aspect of the present invention, a method is provided of operating a forage harvester, the harvester having a crop processor unit located in a crop flow on the output side of a cutterhead for handling crop material including kernels, the crop processor comprising a pair of counter-rotating processor rolls arranged to crack kernels between the rolls when the rolls are in a first position, the method comprising the step of:

moving both processor rolls away from each other to move each roll substantially out of the crop flow to allow the crop flow to bypass the crop processor unit.

The present invention may also include a forage harvester having a crop processor unit located in a crop flow between a cutterhead and a blower, the crop processor unit being for handling crop material including kernels, the crop processor comprising a pair of counter-rotating processor rolls arranged to crack kernels between the rolls when the rolls are in a first position, the one roll being driven by a first power drive and the second roll being driven by a second drive, the first and second drives being independently settable/controllable. One of the drives is preferably a hydraulic drive. The hydraulic drive is preferably adapted to drive the cutterhead in the reverse direction when this is required.

A forage harvester and a method of its operation in accordance with the present invention will now be described in greater detail, by way of example, with reference to the following drawings.

DETAILED DESCRIPTION OF THE ILLUSTRATIVE EMBODIMENTS

The present invention will be described with reference to certain embodiments and certain drawings but the invention is not limited thereto but only by the claims. The drawings are schematic. The terms "front", "rear", "forward", "rearward", "right" and "left" used throughout the specification are determined with respect to the normal direction of movement of the machine in operation and are not to be construed as limiting terms.

Figure 1:
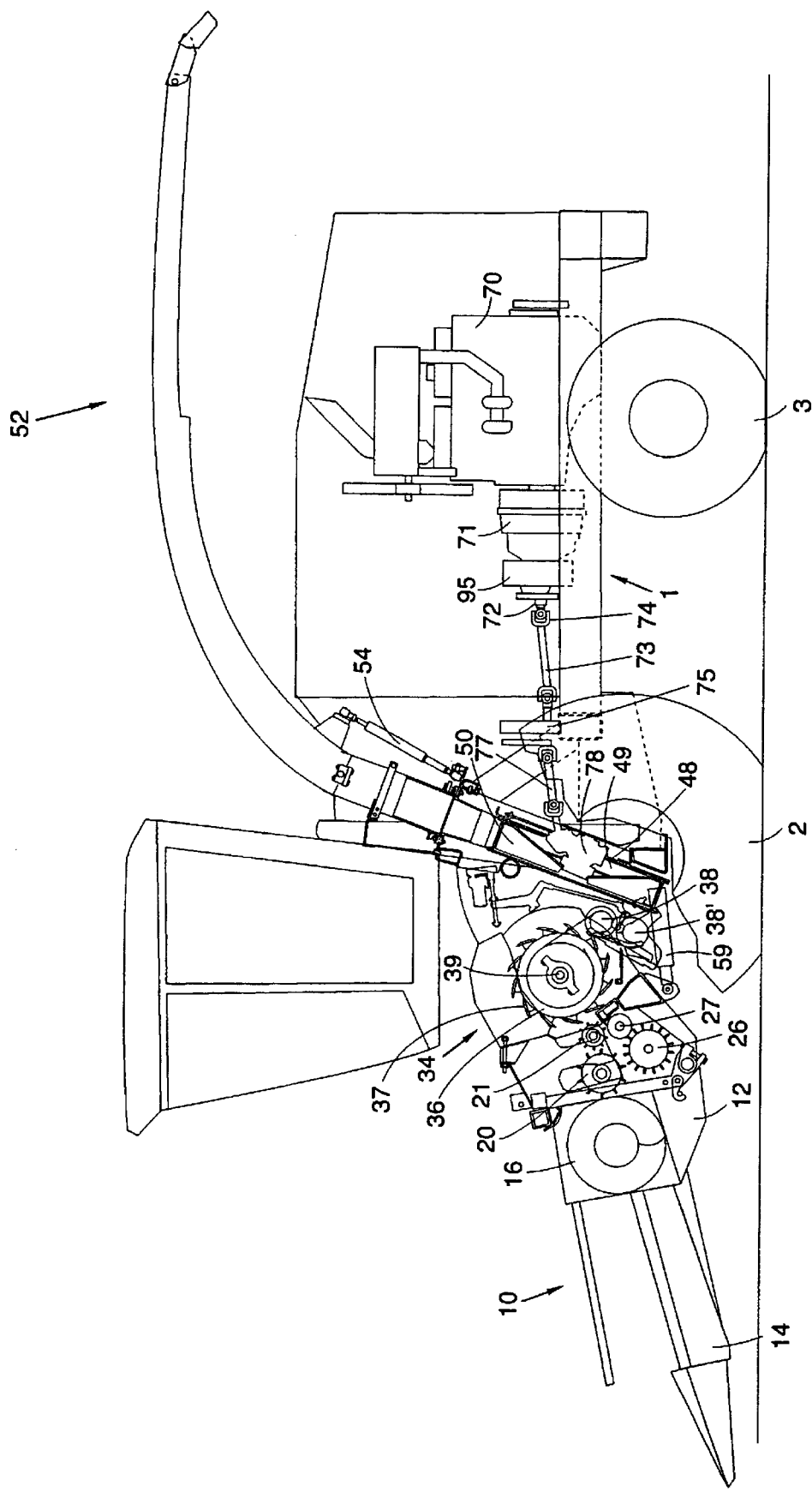
FIG. 1 is a side elevational view of a forage harvester, comprising a front unit, mounted to a main frame and a crop processing apparatus.

With reference to the drawings and more particularly to FIG. 1, there is shown a forage harvester having a main frame 1 on which are mounted ground engaging traction wheels 2 and steering wheels 3. The forage harvester is shown equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the same rearwardly to an auger 16, which in turn delivers the crop material to the bite of feeder means installed in a front unit of the forage harvester.

The forage harvester has feeding means which comprise lower feeder means, including a forward lower feed roll 26, and a smooth, rear lower feed roll 27, and upper feeder means, including an upper forward feed roll 20 and an upper rear feed roll 21. The lower feed rolls 26, 27 are rotatably mounted in a lower feeder frame and the upper feed rolls 20, 21 are mounted in an upper feeder frame, to which the row crop attachment 10 is attached. The upper and lower feeder means rotate to convey the crop material in-between into a cutterhead frame 34 enveloping a cutterhead 36, which comprises a plurality of knives 37, generating a cylindrical peripheral shape or profile, when the cutter-head 36 is rotated. The cutterhead 36 is rotatably mounted in.

The knives 37 co-operate with a fixed shearbar to cut the crop material to length. A crop processor roll assembly is provided comprising a set of counter-rotating compressor rolls 38, 38' mounted therein, which rolls crack the whole kernels which are left in the chopped material. The two counter-rotating compressor rolls 38, 38' may have a substantially cylindrical, fluted surface. The cutterhead 36 projects the cut material into the bite of the compressor roll assembly. This delivers the crushed maize kernels to the blower rotor 49 which is installed within a blower housing 48. The blower rotor 49 comprises a plurality of paddles 50, which throw the material upwardly through the blower or accelerator outlet into a discharge spout 52, which can be positioned by an operator to direct the cut crop material as required, normally into a wagon which is moving alongside or behind the forage harvester. A hydraulic cylinder 54 mounted between the spout 52 and the blower housing 48 provides for vertical movement of the spout outlet.

Figure 2:
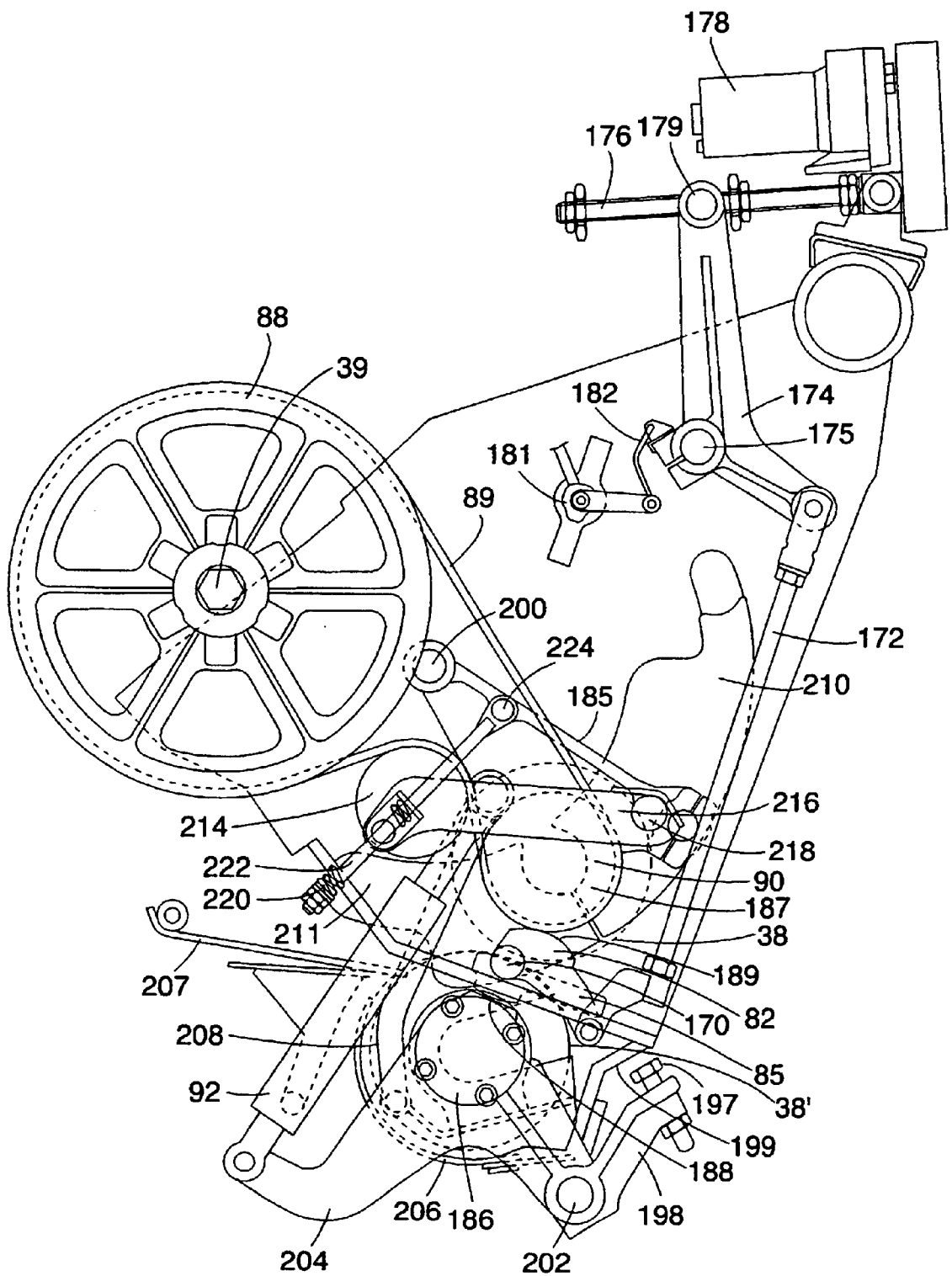
FIG. 2 is a detailed left hand side view of a compressor roll assembly in an operative position according to an embodiment of the present invention.

With reference to FIG. 2, when the cutterhead 36 is rotated in order to comminute incoming crop material, a pulley 88 entrains a transmission belt 89. This transmission belt drives a grooved pulley 90 connected to the upper crop processor roll 38. In accordance with an embodiment of the present invention the drive to the lower processing roll 38' is independent of the drive to the upper roll 38 and will be described later.

When maize is being processed the rolls 38 are close together. In accordance with an embodiment of the present invention, a fine adjustment of the spacing between the rolls is provided in order to obtain optimum splitting of the maize. When maize is not to be processed it is preferred if the crop processor rolls 38 are removed from the crop flow. In accordance with another embodiment the present invention this is done by moving both crop processor rolls 38 out of the crop path. The movement of the rolls 38 is preferably so large that both rolls 38 come substantially clear of the crop path. A typical movement is 150 mm or more, for example 180 mm. Such a large movement of the rolls 38 makes it difficult to provide a conventional, single, permanent transmission belt drive to both upper and lower crop processor rolls 38, 38' using idler roll assemblies to maintain a continuous and uniform tension between the transmission belt and the pulleys on the rolls. Accordingly, as indicated above, a separate drive to the lower roll 38' is preferred. Preferably, the rolls may be moved apart easily, quickly and with the minimum of, or absence of alterations to components of the harvester. This latter embodiment may advantageously be combined with the embodiment of fine adjustment of the rolls.

The fine adjustment of the rolls 38 in the working position will now be described with reference to FIGS. 2 and 4. The lower compressor roll 38' is journalled in a pair of movable bearing housings 186 and the upper compressor roll 38 is journalled in another pair of movable bearing housings 187. The operating position of rolls 38, 38' and therefore their distance apart is determined by a pair of cams 82 on both sides of the cutterhead frame 43 against which the bearing housings of at least one both rolls 38, 38' are pulled by means of a clamping means, e.g. hydraulic cylinders 92, one an each side of the crop processor rolls 38, 38'. Preferably the clamping means are resilient, permitting temporary opening of the rolls when a large amount of crop material is forced inbetween. For hydraulic cylinders this can be realised by one or more gas accumulators linked to the pressure lines of the cylinders. The cams 82 pivot about a pair of stub shafts 170. Where the cams engage the bearing housings 187 of only one of the crop processor rolls 38, the bearing housings 186 of the other roll 38' may be held against surfaces 188 of stationary cam supports 85, provided on both sides of the crop processor frame. The stub shafts 170 of the cams 82 are rotatably mounted to these supports 85.

Figure 3:
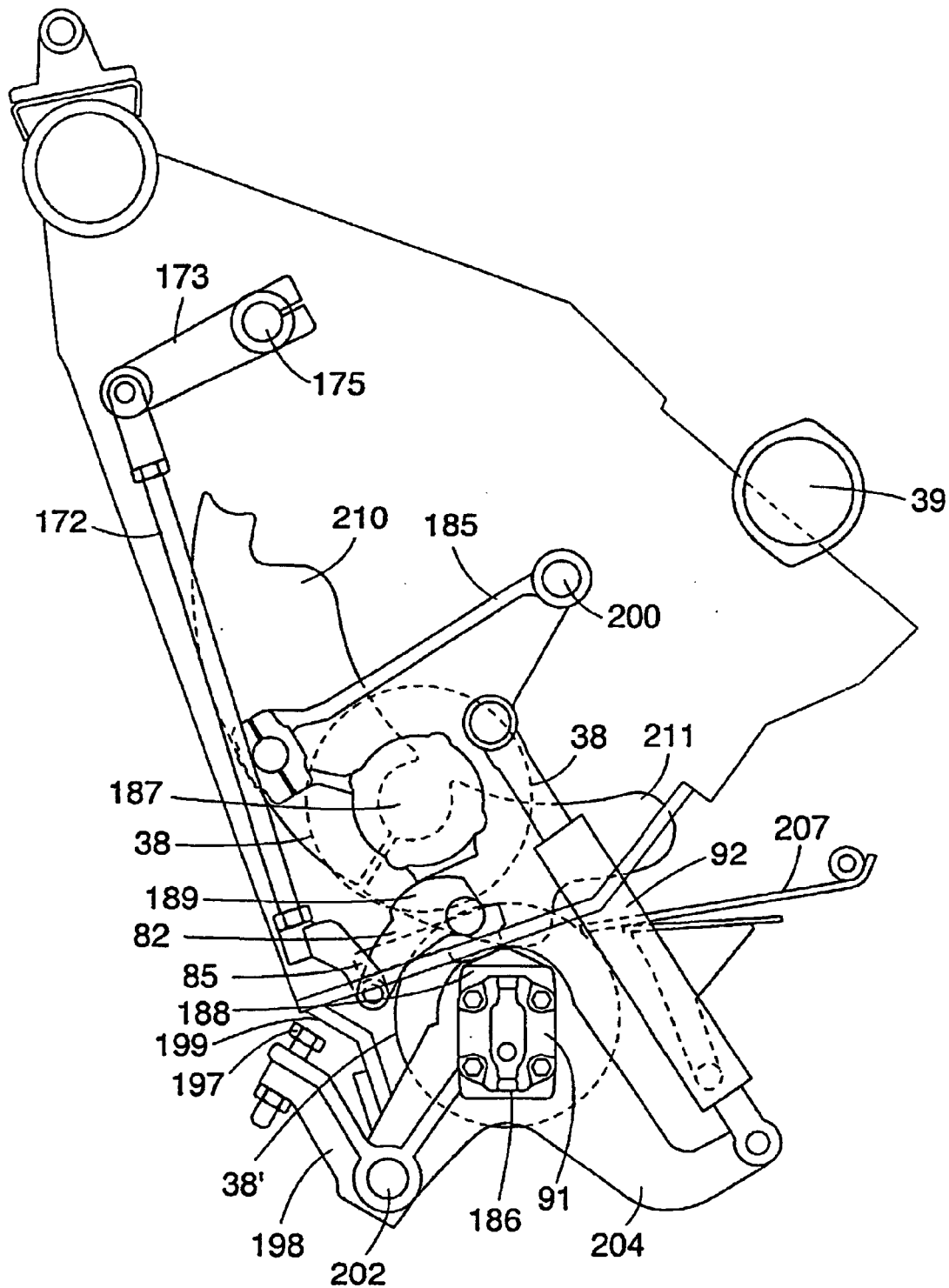
FIG. 3 is a detailed right hand side view of the compressor roll assembly of FIG. 2 in an operative position.

The cams 82 may be rotated by a cam drive. This cam drive may comprise a pair of drive rods 172, linked to the cams 82, a pair of levers 173, 174 linked to a common, transverse pivot shaft 175, a screw 176 and a motor 178. As the motor 178 drives the screw thread 176, an internally threaded boss 179 attached to one end of the lever 174 is moved along screw thread 176. This rotates the lever 174 and the shaft 175 which exerts an upright force on the rods 172 to rotate cams 82. As set out above, the housings 186 of the lower roll 38' are pulled against the surface 188 of the cam support 85. The housings 187 of the upper rolls 38 are pulled against the cams 82 by cylinders 92. An upper surface 189 of the cam 82 is shaped so as to move the upper roll 38 as the cam 82 is rotated. The upper roll 38 is attached to and rotates about an axle 200 which is offset from the centre of rotation of the upper roll 38. Its bearing housing 187 has a rigid member, e.g. a plate or arm 185, which is rotatably attached to the axle 200. A relatively large movement of the boss 179 along the screw thread 176 is required to make a small rotation of the cam 82 so that very fine control of the distance separating rolls 38, 38' is provided (see FIGS. 3,4).

Alternatively, the fine adjustment system may be provided with a pair of cams which engage both the upper and lower bearing housings 186, 187. Then no lower cam support is needed. The upper cam surface 189 may be shaped as described above to effect a small vertical movement of the upper roll 38 when the cam is rotated. The lower surface, which engages the lower bearing housing 186, then preferably has a circular or arcuate shape the centre of the circle or arc coinciding with the centre of shaft 170. Hence, as cam 82 rotates, the lower roll 38' stays in the same position. From his cab, the operator has no direct view on the position of the crop processor rolls. Therefore it is advantageous to equip the crop processor assembly with a device or sensor providing a signal indicative of the actual roll spacing. Such sensor may be incorporated into the electrical motor 178 itself or it may be a distinct sensor, e.g. a potentiometer 181 which is linked to any of the moving parts. For instance, the arm of the potentiometer may be connected by a lever 182 to the drive lever 174. The sensor signal may be provided to a monitor or display informing the operator of the roll spacing as set by the cams 82.

The embodiment of the present invention which allows rapid and wide spacing of the rolls 38 will now be described with reference to FIGS. 2 and 5. As indicated above upper roll 38 is hinged about the axle 200. The lower roll 38' is hinged about a transverse axle 202 whose centre is offset from the centre of the lower roll 38'. The bearing housings 186, 187 of the two rolls 38, 38' are pressed against the cam 82 and the cam support 85 by means of a suitable clamping means, e.g. hydraulic or pneumatic cylinders 92, one placed on each side of the rolls 38, 38' as seen from the forward direction of the harvester. One end of the cylinders 92 is rotatably attached to an arm 204 which is attached to the lower roll housing 186. The other end of the cylinder 92 is rotatably attached to a position on upper arm 185 intermediate the centre of the upper roll 38 and the axle 200. By reversing the operation of cylinders 92, i.e. making them extend, the rolls 38, 38' are moved apart. Lower roll 38' rotates about axle 202 downwards until its housing 186 reaches a stop. This stop may be effected by the head of a stop bolt 197 on a lever arm 198 of the housing 186 hitting a rear member 199 of the crop processor frame. This movement should be sufficient to remove the lower roll 38' from the crop flow (typically about 20 mm).

The upper roll 38 rotates about the axle 200 until it is also substantially out of the crop flow. This movement is typically larger, e.g. about 160 mm. The upper position of the roll 38 may be determined by the full stroke of the cylinders 92. Accordingly, it is possible to move the crop processor rolls 38, 38' 180 mm away from each other.

The shafts of the upper crop processor roll 38 extend through curved apertures in the side panels of the crop processor assembly. These apertures are covered by similarly curved plates 210, 211, which are connected to both sides of the bearing housing 187. As such they are moved in unison with the roller 30 about the axle 200, providing a continuous closing of the crop processor housing.

Generally, a tensioned idler roller 214 should be provided for the transmission belt drive 89 to the upper roll 38 from the cutterhead 36 so that the upper roll 38 is still driven by the belt drive even though the upper roll 38 is no longer close to the lower roll 38'. The purpose of permanently driving the upper roll 38 is to prevent pitting of the roller bearings when the roll is held stationary for long times. The pivot point 200 of the upper roll 38 should be chosen in such a position that the distance between the upper roll 38 and the drive shaft of the cutterhead 36 varies only little. Thus, there is little change in the length of the belt drive between the cutterhead 36 and the upper roll 38. If desired the belt drive can be removed if the upper roll should not continue rotating, but this is less preferred.

Figure 4:
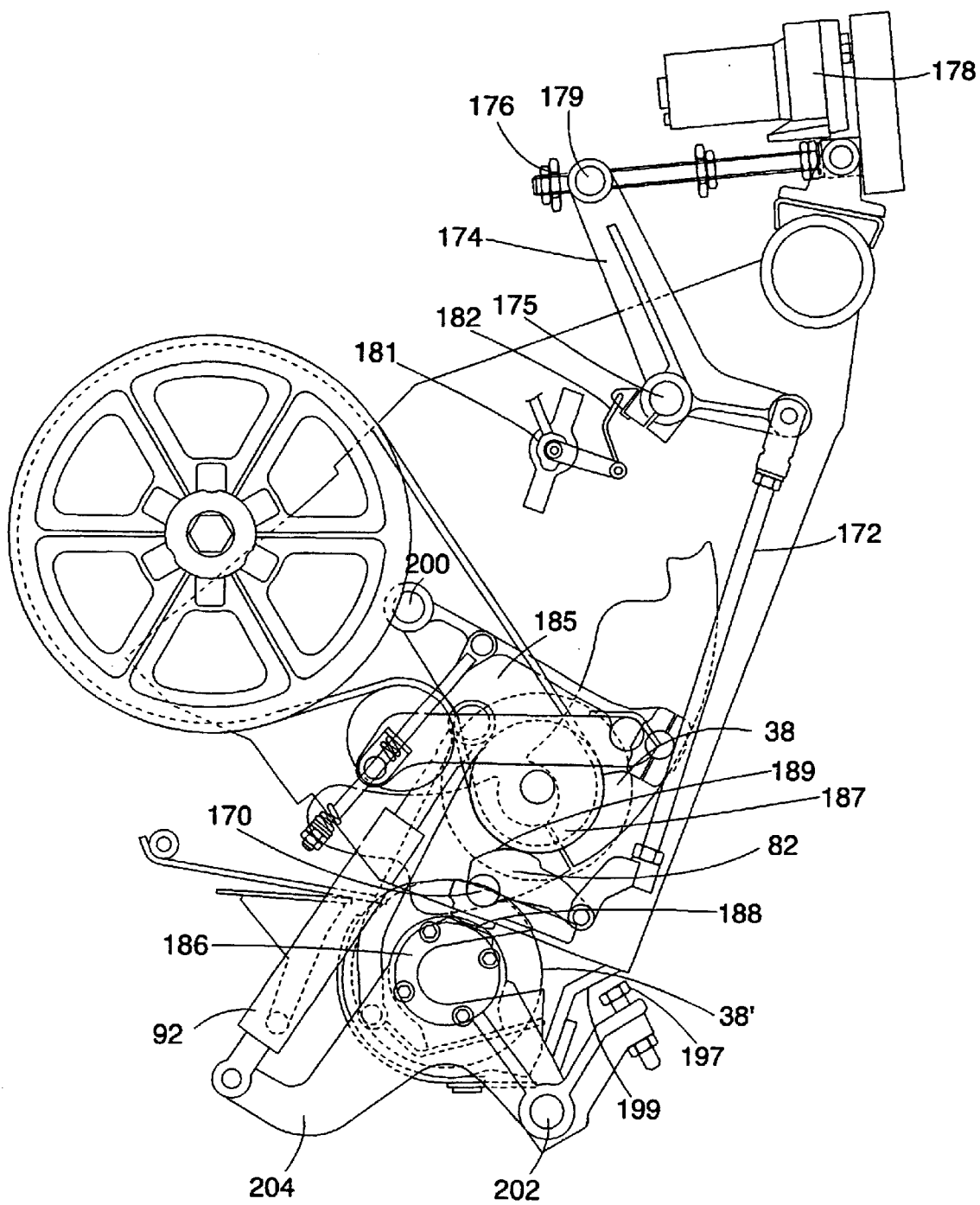
FIG. 4 is a left hand side view of the compressor roll assembly of FIG. 2 illustrating a fine adjustment mechanism in a different position than shown in FIG. 2.
Figure 5:
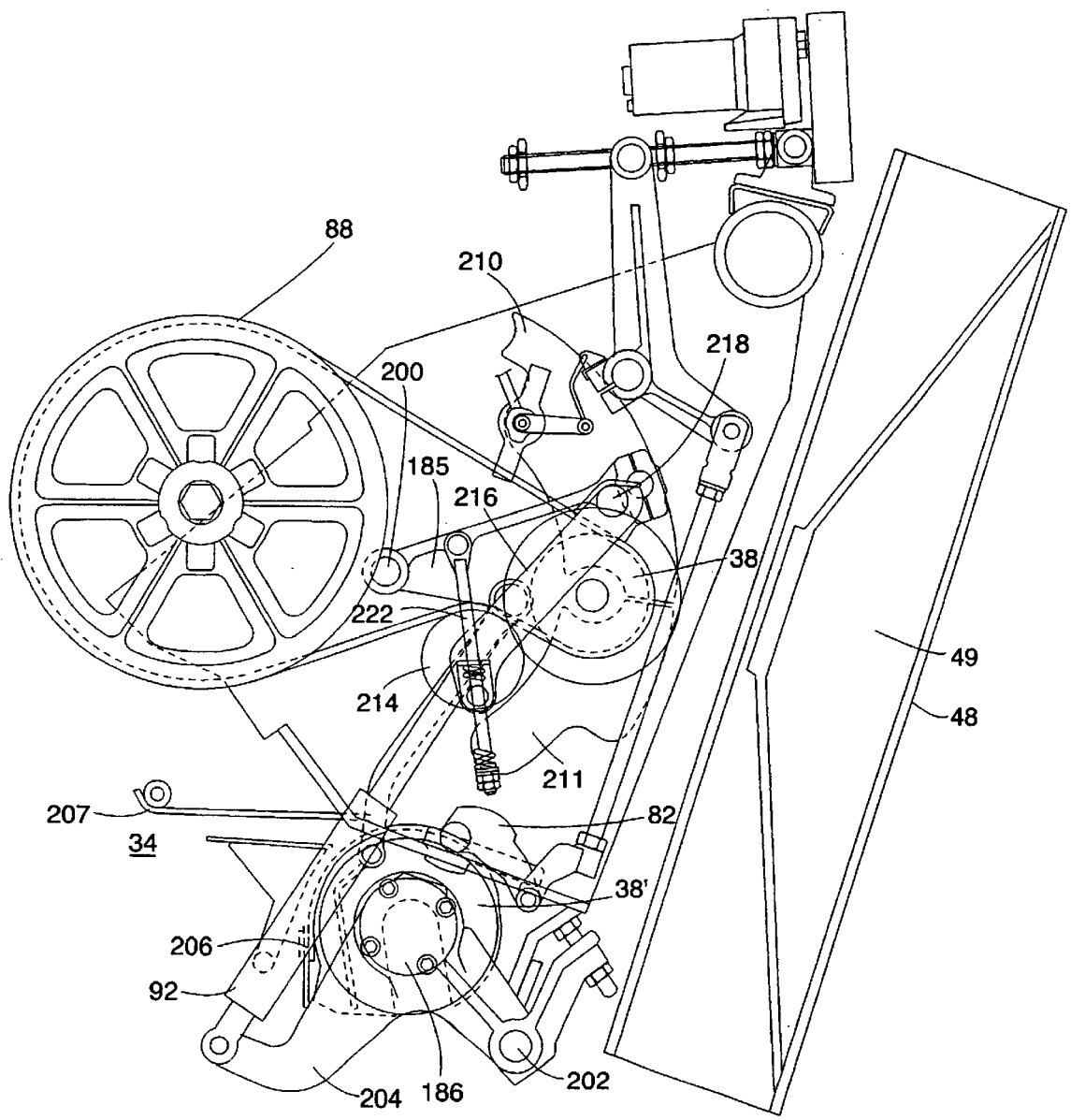
FIG. 5 is a left hand side of the compressor roll assembly of FIG. 2 in an inactive position.

As shown in FIGS. 2, 4 and 5, the idler roller 214 is rotatably attached to one end of an idler arm 216, the other end being mounted to a pivot 218 on the rear portion of the bearing housing arm 185. The roller 214 is loaded against the belt 89 by means of a compression spring 220 mounted between the end of a tensioning rod 222 and a bracket on the idler arm 216. The other end of the tensioning rod is affixed at pivot 224 to the housing arm 185. As the tensioning system is moved up and down in unison with the upper crop processor roll 38 and as the distance between the pulleys 88 and 90 varies little, there is no need to make any adjustments to the spring 220 or any other portion of the drive system, when the rolls 38, 38' are relocated from their active to their inactive position and vice versa.

Preferably, a protection member is provided for at least one of the upper and lower rolls 38, 38' in order to prevent crop building up on the respective roll when the rolls are in the widely spaced position,. Typically, this protection member will be provided for the lower roll 38' to which most of the crop material is forwarded along guide plate 207 and onto which crop may fall. This crop protection member may be a plate 206 which is automatically swung into position when the rolls 38, 38' are spaced by the cylinders 92, 93. Plate 206 has the functions of preventing crop material delivered from the cutterhead 36 along guide plate 207 accumulating on the lower roll 38' and of guiding any such crop towards the blower rotor 49.

Plate 206 may be curved, i.e. arcuate in form, and be close fitting to the outer diameter of the lower roll 38'. It is rotatably mounted on the same shaft as the lower roll 38' and rotates about this shaft along a circumference of a circle. A tie-rod 208 is provided between the arm 185 and the side plate 206. As cylinders 92 extend, arm 185 rotates about axle 200 thus drawing the tie-rod 208 with it. This pulls plate 206 in an arc about lower roll 38' until it is located above the lowered roll 381 (best seen in FIG. 5). Preferably, in the final position of plate 206, its rear portion directs crop material from guide plate 207 directly into blower housing 48. Preferably, the plate 206 forms a closed cavity with part of the cutterhead frame 34 when the plate 206 is in both its upper and lower position so that crop cannot escape from the crop flow and must be transferred to the blower 50. At the same time the movement of the plate 206 into the upper position leaves a large opening below the lower crop processor roll 38'. This latter roll is still driven when it is in its lower position so that debris such as sand or mud is removed from the lower roll 38' and falls away from the machine. Thus, when the crop processor assembly is required again, the lower roll returns to its operative upper position not blocked by sand, mud or old dried-on crop material.

The lower roll 38' is preferably driven by an independent power drive. This drive is preferably connected to the lower roll 38' by a flexible power connection such that as the roll 38' moves into its lower position the drive is maintained. Suitable drives for the lower roll 38' may be a separate belt drive, an electric motor with a flexible cable connection thereto or a hydraulic or pneumatic motor with a flexible hydraulic or pneumatic connection thereto. In the following a hydraulic motor will be described in detail.

It is generally believed that the power necessary to drive a crop processor is way beyond that which can be supplied economically by common hydraulic motors. One aspect of the present invention is the use of a hydraulic drive for the lower and slower of the two counter-rotating rolls 38, 38' of the crop processor assembly. The upper roll 38 is driven by the main drive line of the harvester, preferably via a transmission belt. Thus, the main power unit of the harvester supplies the main power requirement of the crop processor. The speed of the top roll 38 is set to be faster than the speed of the bottom roll 38' so that the speed differential causes the grinding, breaking action of the crop processor rolls on the maize kernels. The present inventors have determined that the power supplied to the lower roll 38' can be less than to the top roll 38 and that this lower power lies within the range deliverable by a hydraulic motor 91. In addition, a further aspect of the present invention is the optimal use of a gear motor 110 as a pump to drive a hydraulic motor for the lower roll 38' as well as a motor when the cutterhead 36 needs to be reversed. This dual functionality of the gear motor 110 is particularly efficient.

Figure 6:
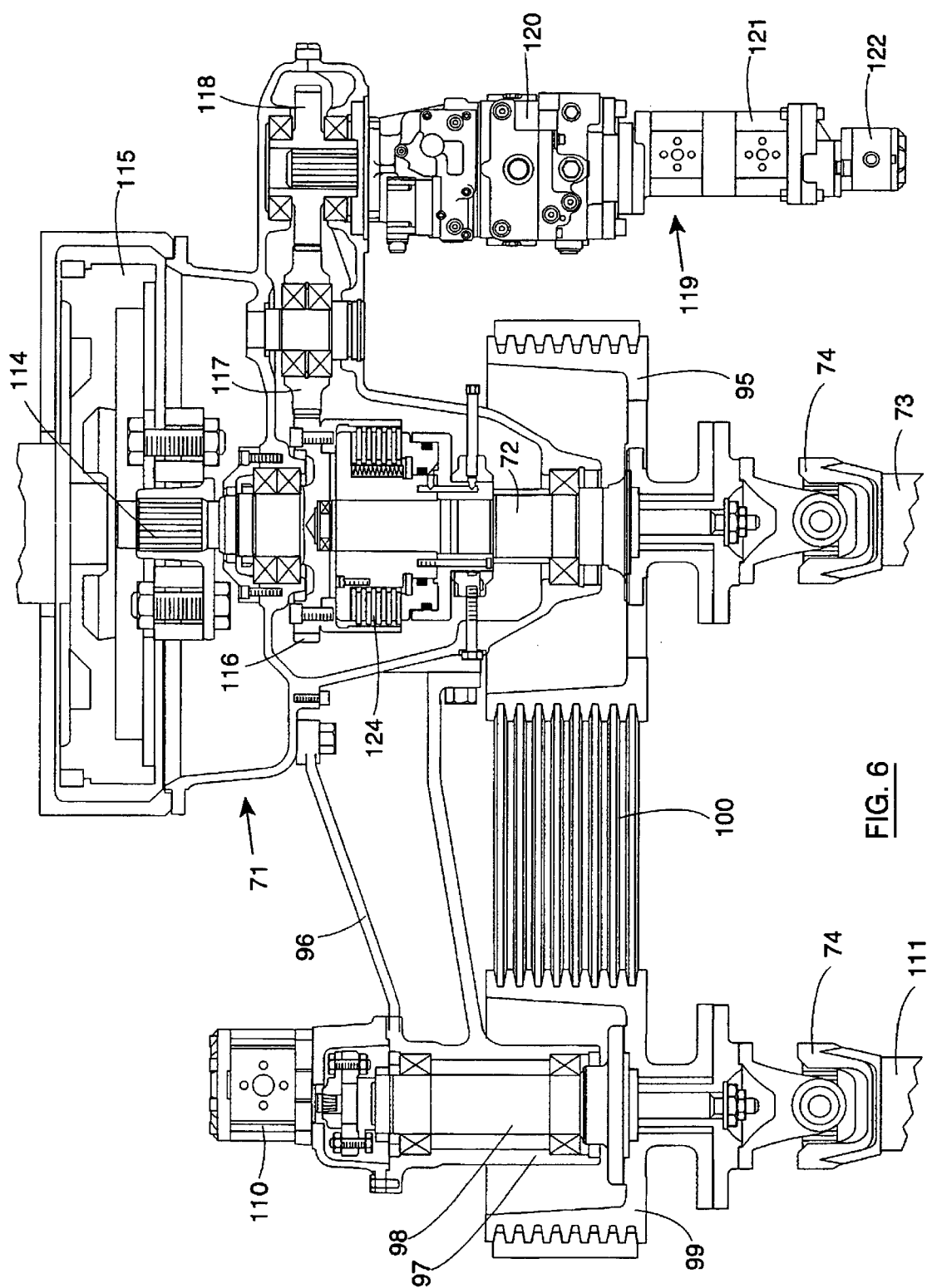
FIG. 6 is a sectional view of a PTO assembly of a harvester which may be used with the present invention.
Figure 7:
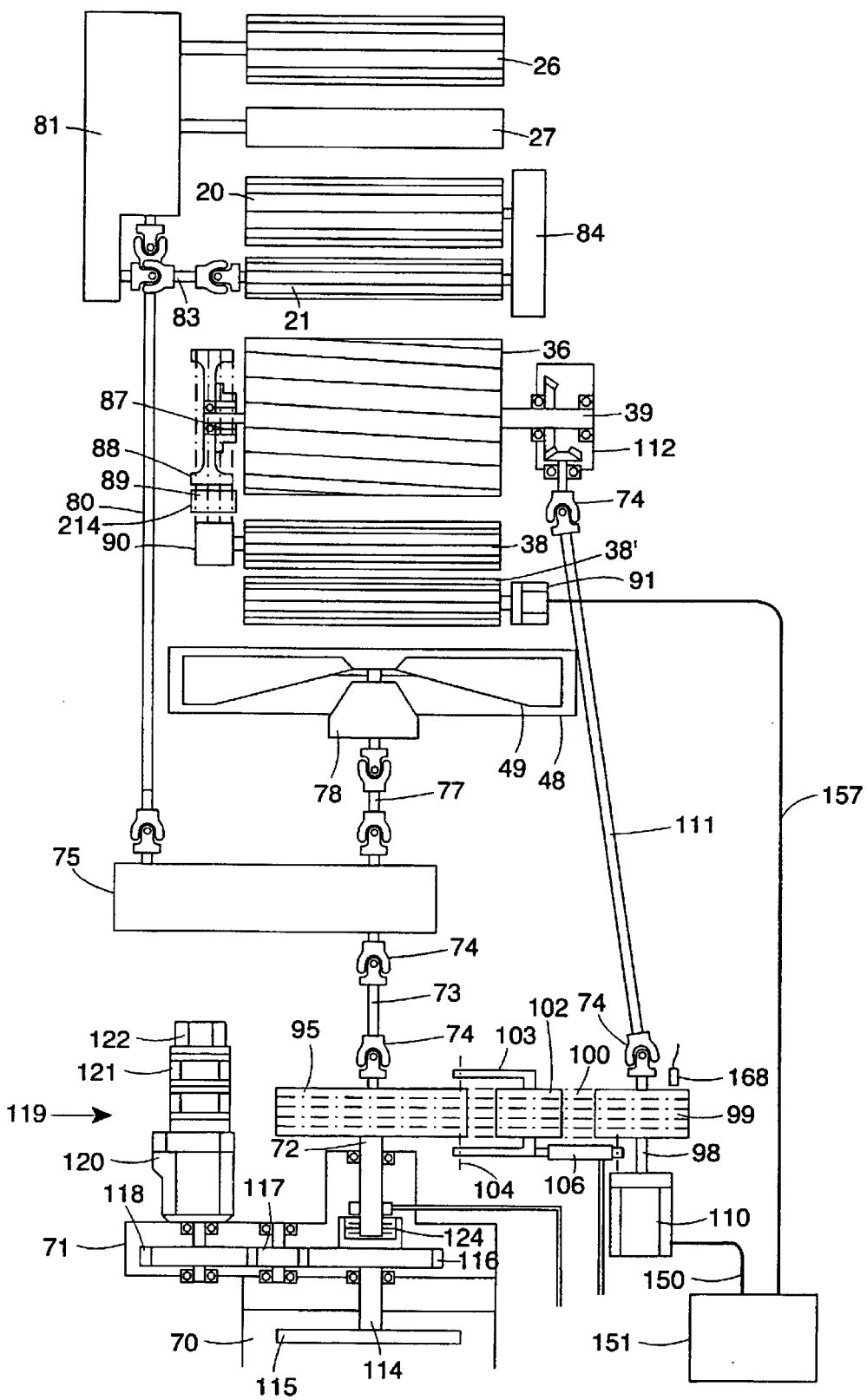
FIG. 7 is a schematic view of the drive lines and driven crop processor assembly in accordance with embodiments of the present invention.

As shown in FIGS. 1, 6 and 7, the forage harvester is driven by a power plant or engine 70, which is drivingly connected to a power-take-off (PTO) gearbox 71. The output shaft 72 of the PTO gearbox 70 is linked to a universal joint 74 of a drive shaft 73, whereof another universal joint 74 is linked to a transmission 75. An output shaft of the transmission 75 is connected to a blower drive shaft 77, which drives a blower gearbox 78, which supports and rotates the blower rotor 49. As depicted in FIG. 6, the output shaft 72 of the PTO gearbox 71 carries a grooved PTO pulley 95, to which the universal joint 74 of the drive shaft 73 is mounted. An arm 96 of a bearing housing 97 is attached to the right hand side of the PTO gearbox 71. In the bearing housing 97 a shaft 98 is rotated, which carries a pulley 99 at its front end. A transmission belt 100, running over both pulleys 95, 99, can be tensioned with an inner idler roll 102, which is rotated in an idler arm assembly 103, which is pivoted about a journal 104, extending from the PTO gearbox 71. The idler roll 102 is loaded by a hydraulic cylinder 106, which is installed between the bearing housing 97 and a protrusion of the idler arm assembly 103.

A hydraulic gear motor 110 is mounted onto the rear of the bearing housing 97 and its output shaft is coupled to the rear end of the shaft 98. A cutterhead drive shaft 111 is connected with a universal joint 74 to the front of the pulley 99. The other end of the drive shaft 111 is connected by another universal joint 74 to the input shaft of an angle transmission 112, which drives the cutterhead axle 39.

The PTO gearbox 71 comprises a PTO input shaft 114, which is coupled at its rear end to the flywheel 115 of the engine 70 and at its front end to a first spur gear 116, meshing with a second spur gear 117. The latter gear 117 drives a third spur gear 118, which receives the input shaft of a hydraulic pump assembly 119, comprising a squash plate pump 120, which provides driving power to the traction wheels 2, and gear pumps 121, 122. The PTO input shaft 114 is linked to the PTO output shaft 72 by means of a hydraulically actuated clutch 124. When fluid pressure is applied thereto, the clutch 124 becomes engaged and the output shaft 72 is rotated unitarily with the input shaft 114.

The drive lines are illustrated schematically in FIG. 7, together with their relationship to the crop processing assembly of the forage harvester. A first drive line portion comprises the cutterhead drive shaft 111, the angle transmission 112, the cutterhead axle 39, an overrun clutch 87 and the belt transmission, comprising the pulley 88, the upper crop processor pulley 90 and the transmission belt 89. A second drive line portion comprises the drive shaft 73, the transmission 75, the blower drive shaft 77 and gearbox 78, the drive shaft 80, the lower feedroll transmission 81, the drive shaft 83 and the upper feedroll transmission 84. A third drive line portion comprises the transmission belt 100, running over pulleys 95, 99, inner idler roll 102, a gear motor 110, hydraulic circuitry 150, 151, 157 and hydraulic motor 91 for driving the lower compressor roll 38'. Other devices, such as the row crop attachment 10 may equally be driven by one or other of the drive line portions.

The first drive line portion is connected to the second by means of the main belt transmission, comprising the sheaves 95, 99 and the belt 100. It can be disconnected therefrom by releasing the pressure from the hydraulic cylinder 106, which then retracts under action of the belt 100 and the idler roll 102. The belt 100 is set loose and disengages from the grooves of the pulleys 95, 99.

The first and second drive lines can be connected to and disconnected from the engine 70 by means of the hydraulic clutch 124. Meanwhile the hydraulic pump assembly 119 remains constantly driven by the engine 70 through the gears 116, 117 and 118.

Figure 8:
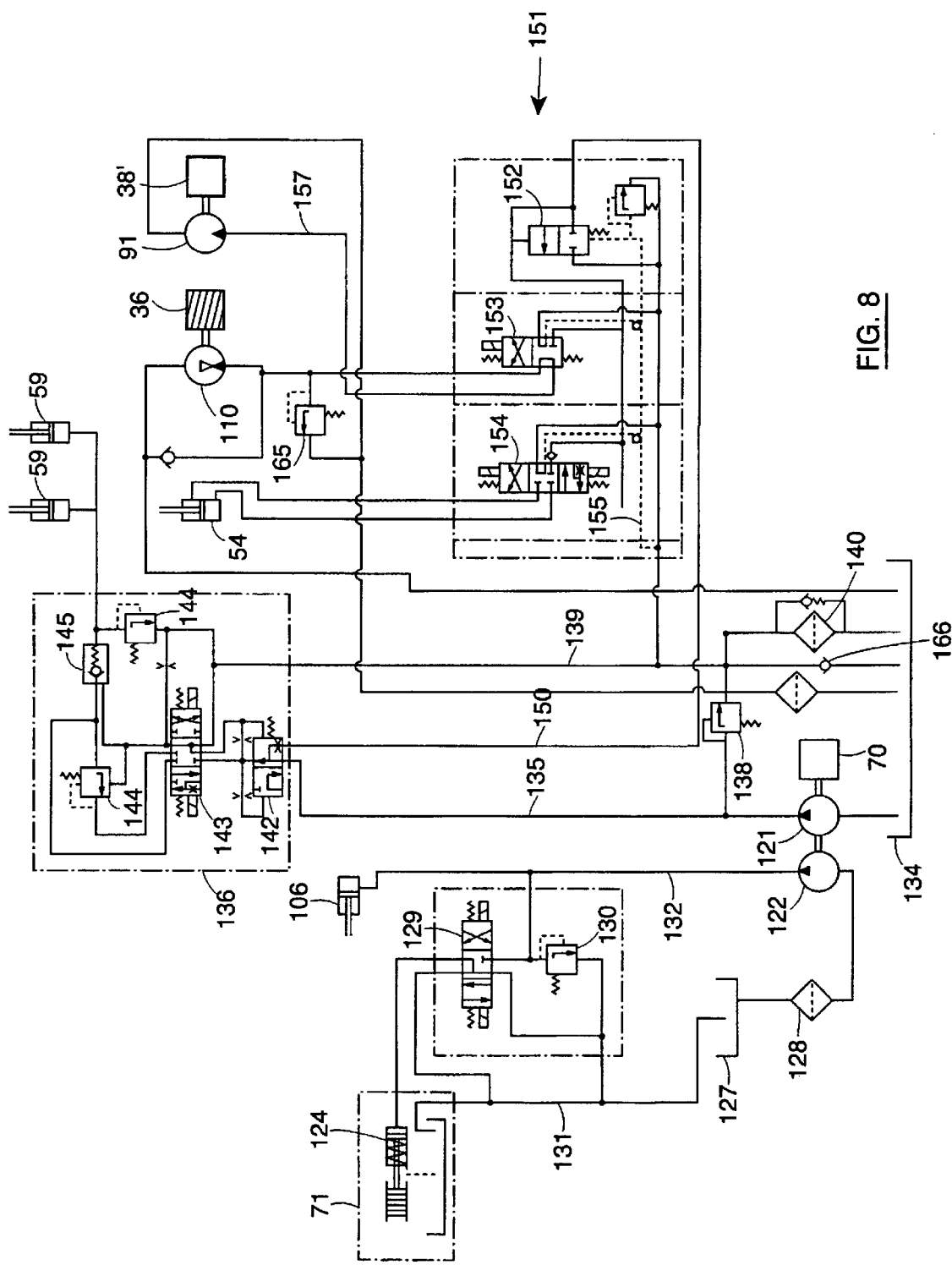
FIG. 8 is a schematic representation of part of a hydraulic circuit in accordance with an embodiment of the present invention.

A portion of the hydraulic control system is 30 schematically represented in FIG. 8. When the engine 70 is running, the hydraulic gear pump 122 draws oil from a shunt tank 127 through an oil filter 128 and feeds it via a hydraulic feed line 132 to a solenoid operated control valve 129 and the hydraulic cylinder 106 of the 35 main belt transmission. One output port of the valve 129 is connected to the hydraulic clutch 124, the other is connected to the return line 131, which ends in the shunt tank 127.

Immediately after the start of the engine 70, the valve 129 is still in its rest position, shown in FIG. 8, and the feed line 132 is pressurised as to extend the cylinder 106. The pressure level is controlled by a relief valve 130, which is equally linked to the feed line 132. The position of the valve 129 is controlled by an electrical circuit (not shown), comprising a programmable control unit, such as a microprocessor.

In order to engage the hydraulic clutch 124, the valve 129 is shifted to the right so that the pressure from feed line 132 is applied to the piston of the clutch 124. Only a small amount of leakage oil drips from the clutch into the PTO gearbox 71, which is also connected to the return line 131. The feed line 132 and the cylinder 106 remain pressurised. Consequently, both the first and second drive line portions are now driven by the engine 70.

The hydraulic oil from the clutch 124 also serves as a lubricant to the bearings and the gears 116, 117, 118 in the gearbox 71. Thereby most of the oil is mixed with air and divided over the inner surface of the gearbox 71, which makes the latter unsuitable for use as a tank from which the oil may be drawn by the gear pump 122. Therefore the surplus oil is delivered to the shunt tank 127, where it can settle before it is fed to the gear pump 122.

When the valve 129 is shifted to the left, the feed line 132 is connected to the return line 131, so that the pressure in the feed line 132 drops and the hydraulic clutch 124 disengages. Simultaneously the hydraulic cylinder 106 retracts under the action of the transmission belt 100, so that the first drive line portion, comprising the cutterhead drive shaft 111, is disconnected from the second drive line portion. When the control valve 129 is shifted back to the right in order to re-engage the clutch 124, it passes through the middle position, in which only the cylinder 106 is pressurised. The idler roll 102 thus is loaded before the clutch 124 starts to rotate the PTO pulley 95. This operating sequence prevents unnecessary slippage of the belt 100, so that its lifetime will be extended.

The engine 70 is equally driving the gear pump 121, which draws hydraulic oil from an oil tank 134 and feeds it via another feed line 135 to a valve assembly 136, which controls the oil flow to the hydraulic lift cylinders 59 between the cutterhead frame 34 and the main frame 1. The feed line 135 is protected against overpressure by a pressure relief valve 138, which is connected to a return line 139, which feeds the return oil through a filter 140 to the oil tank 134.

The valve assembly 136 comprises a slave valve 142, which is hydraulically controlled by a solenoid operated control valve 143, and two pressure relief valves 144. The electrical circuit, which controls the clutch valve 129, equally controls the valve 143. When the latter is in its rest position, shown in FIG. 8, oil pressure will build up at the left side of the slave valve 142, which consequentially shifts to the right and connects the feed line 135 to a feed line 150 of a stack valve 151. When a solenoid of the valve 143 is energised to shift the latter to the right, equal oil pressure will build up on both sides of the slave valve 142, which then will be shifted back by a spring to the position shown in FIG. 8. Oil from the feed line 135 is supplied through the valves 142, 143 and a non-return valve 145 to the hydraulic lift cylinders 59, which extend to lift the attachment 10. When the other solenoid of the control valve 143 is energised to shift the same to the left, oil pressure is provided to the non-return valve 145, which opens to let oil flow from the cylinders 59 to the valve 143 and therefrom to the return line 139, whereby the cylinders 59 retract and the cutterhead frame 34 and the attachment 10 are lowered.

The stack valve 151 controls a plurality of hydraulic devices, whereof only a few are depicted. For instance it can also be used for providing pressurised oil to the cylinders 92 of the crop processor assembly. The feed line 150 is received at a distributor valve 152, to which at least two solenoid operated control valves 153, 154 are mounted. The latter are electrically connected to the electrical circuit mentioned above. When said valves 153, 154 are in their rest position, as shown in FIG. 8, the oil pressure in the feed line 150 pushes the valve 152 downwardly, as to connect the feed line 150 to the return line 139. When any of the solenoids of the valves 153, 154 is energised to shift the latter up or down, oil pressure will be provided to a control line 155 and the distributor valve 152 is shifted upwardly as to divert the oil flow from the return line 139 to the actuated valve.

The solenoid operated valve 154 is linked to the hydraulic cylinder 54 of the spout 52. When the valve 154 is shifted upwardly, the cylinder 54 will extend as to raise the spout 52. When it is shifted down, the cylinder 54 will retract as to lower the spout 52. A parallel valve (not shown) may be used to control the position of the cylinders 92 on the crop processor assembly in a similar way.

The solenoid operated valve 153 is linked to the hydraulic gear motor 110, which is drivingly linked to the cutterhead 36. When the valve 153 is not actuated and the cutterhead 36 is rotated in its normal operation sense (that is to comminute crop material) by the engine 70, the PTO gearbox 71 and the main belt transmission, the gear motor 110 is also driven by the same drive lines. The rotation of the gear motor 110 is in the reversed sense and it acts as a gear pump providing an oil flow and oil pressure via line 157 to the hydraulic motor 91 which drives lower compressor roll 38'. The speed of the lower roll 38' is set to be slower than the speed of the upper roll 38. For example, the upper roll 38 may be set to between 3900 and 4300 RPM and the lower roll to between 3000 and 3400 RPM. This differential enhances the maize cracking action between the two counter-rotating rolls 38, 38'. The power delivered to the upper roll 38 may be up to 100 HP whereas the hydraulic gear motor 91 may deliver about 20 kW.

When the cutterhead is disconnected from the PTO pulley 95 and the solenoid of valve 153 is energised by the electrical circuit, the oil flows from the feed line 150 to the gear motor 110 and drives the latter as a motor to rotate the cutterhead 36 in a sense opposite to the normal operating sense. The motor 110 is protected by a pressure relief valve 165.

When the operator of the forage harvester gives a command to reverse the cutterhead 36 through the electrical circuit, the control unit will de-energise the solenoids of the control valve 129, which consequently returns to its rest position, shown in FIG. 8. The hydraulic clutch 124 is disengaged, but the main belt transmission remains engaged by the pressure of the hydraulic cylinder 106, maintaining the first drive line portion coupled to the second drive line portion, and hence the rotating cutterhead 36 to the other crop processing means, comprising the blower rotor 49 and the feedrolls 20, 21, 26, 27. The moment of inertia of the cutterhead 36 temporarily drives said other crop processing means, the reaction whereof assists in slowing down the rotating cutterhead 36. Meanwhile, the speed of the cutterhead 36 is monitored by a sensor 168 (FIG. 7) which is linked to a control unit, which inhibits the actuation of the reversing mechanism as long as said speed exceeds the threshold of 10 rotations per minute.

When the cutterhead speed has fallen below said threshold, the control unit energises a solenoid of valve 129 in order to shift the latter to the left, retract the cylinder 106 and disengage the main belt transmission. Thereafter, the control unit energises the solenoid of the valve 153 for providing driving power to the reversing gear motor 110, which now rotates the cutterhead 36 in the opposite sense. At the same time hydraulic power to the motor 91 of the lower crop processor roll 38' is disengaged by the action of valve 153. The overrun clutch 87, which otherwise drives the upper crop processor roll 38, disengages and, as the main belt transmission between the cutterhead 36 on the one hand, and the blower rotor 49 and the feedrolls 20, 21, 26, 27 on the other hand, was already disengaged, the gear motor 110 only has to drive the cutterhead 36.

The skilled person will appreciate that the present invention includes a crop processor assembly in a forage harvester with counter-rotating rolls with which the spacing between the rolls may be finely adjusted when they are in a first position suitable for cracking kernels, or the spacing between the rolls may be increased considerably to a second position so that they are substantially out of the crop flow. Both these modes of operation are carried out in a simple manner which is quick, efficient and which may be executed with no or a minimum amount of changes to existing components, e.g. swapping or removal of belt drives. These functions may be combined with a cutterhead reversal mechanism which makes use of part of the drive system without involving changes in components during the change to reversal of the cutterhead, e.g. changing of belt drives.

While the invention has been shown and described with reference to preferred embodiments, it will be understood by those skilled in the art that various changes or modifications in form and detail may be made without departing from the scope and spirit of this invention.

What is claimed is:

1. A forage harvester comprising:
a crop processor unit located in the path of a crop flow between a cutterhead and a blower, the crop processor unit being for handling crop material including kernels, the crop processor comprising a pair of counter-rotating processor rolls arranged to crack kernels between the rolls when the rolls are in a first position, one of said rolls being movable,
wherein the other of said rolls is movable and that said rolls are movable away from each other to move each roll substantially out of the crop flow into a second position.

2. The forage harvester described in claim 1, further comprising a first drive to one roll of the pair of crop processor rolls is independently controllable with respect to a second drive to the other roll thereof.

3. The forage harvester described in claim 2, wherein in that one or both of the independent first and second drives is a belt drive.

4. The forage harvester described in claim 3, wherein one drive of the first and second drives is driven more slowly than the other.

5. The forage harvester described in claim 4, wherein that the one drive of the first and second drives which is driven faster is a belt drive.

6. The forage harvester described in claim 5, wherein that the other of the first and second drives which is driven slower is one of a further belt drive, an electric drive, a hydraulic drive or a pneumatic drive.

7. The forage harvester described in claim 6, wherein that the other of the drives is adapted to operate directly on the relevant crop processor roll and is connected to the power plant of the forage harvester by means of a flexible power connection.

8. The forage harvester described in claim 7, wherein that the other drive is a hydraulic drive and the hydraulic drive is adapted to rotate the relevant crop processor roll in one mode and to rotate the cutterhead in a reverse direction in a second mode.

9. The forage harvester described in claim 8, further comprising a cover plate which is movable to shield one of the two counter-rotating rolls from the crop flow when the rolls are moved into the widely spaced second position.

10. The forage harvester described in claim 9, further comprising an actuator for moving the processor rolls from the first to the second position so that each roll is substantially out of the crop flow.

11. The forage harvester described in claim 10, wherein the actuator is a hydraulic cylinder.

12. The forage harvester described in claim 11, wherein each counter-rotating roll is hingedly mounted on an axis by a support member and one end of the hydraulic cylinder is attached to one support member and another end of the cylinder is attached to the other support member.

13. The forage harvester described in claim 12, further comprising a clamp for clamping the relative position of the rolls when in the first position.

14. The forage harvester described in claim 13, wherein the clamp is a resilient clamp.

15. The forage harvester described in claim 14, further comprising a roll spacing adjustment mechanism for finely adjusting the spacing between the counter rotating rolls in the first position.

16. The forage harvester described in claim 15, wherein the adjustment mechanism includes a cam and a first cam follower being provided by a portion of a housing for one of the pair of counter rotating rolls.

17. A method of operating a forage harvester, the harvester having a crop processor unit located in a crop flow between a cutterhead and a blower and for handling crop material including kernels, the crop processor comprising a pair of counter-rotating processor rolls arranged to crack kernels between the rolls when the rolls are in a first position, the method comprising the step of:
moving both processor rolls away from each other to move each roll substantially out of the crop flow to allow the crop flow to bypass the crop processor unit.

18. The method according to claim 17, wherein the step further comprises the step of using two drives for driving one roll of the pair of crop processor rolls independently of the driving of the other roll thereof.

19. The method according to claim 18, wherein the using step further comprises driving one drive of the first and second drives more slowly than the other drive.

20. The method according to claim 19, further comprising the steps of:
using one of the drives to rotate one crop processor roll in one mode and to rotate the cutterhead in a reverse direction in a second mode.

21. The method according to claim 20, further comprising the step of:
moving a cover plate to separate one of the two counter-rotating rolls from the crop flow when the rolls are moved into their widely spaced position.

22. The method according to claim 21, further comprising the step of:

clamping relative position of the rolls when in the first position.

23. The method according to claim 22, wherein the clamping is resilient clamping.

24. The method according to claim 23, further comprising the step of:

adjusting finely the spacing between the counter rotating rolls when in the first position.

25. A forage harvester having a crop processor unit located in a crop flow between a cutterhead and a blower, the crop processor unit being for handling crop material including kernels, the crop processor unit comprising a pair of counter-rotating processor rolls arranged to crack kernels between the rolls when the rolls are in a first position, the one roll being driven by a first power drive and the second roll being driven by a second power drive, the first and second drives being independently controllable.

26. The forage harvester described in claim 25, wherein one of the first and second drives is a hydraulic drive.

27. The forage harvester described in claim 26, wherein the hydraulic drive is adapted to rotate the relevant crop processor roll in one mode and to rotate the cutterhead in a reverse direction in a second mode.

* * * * *